United States Patent Office 3,135,678
Patented June 2, 1964

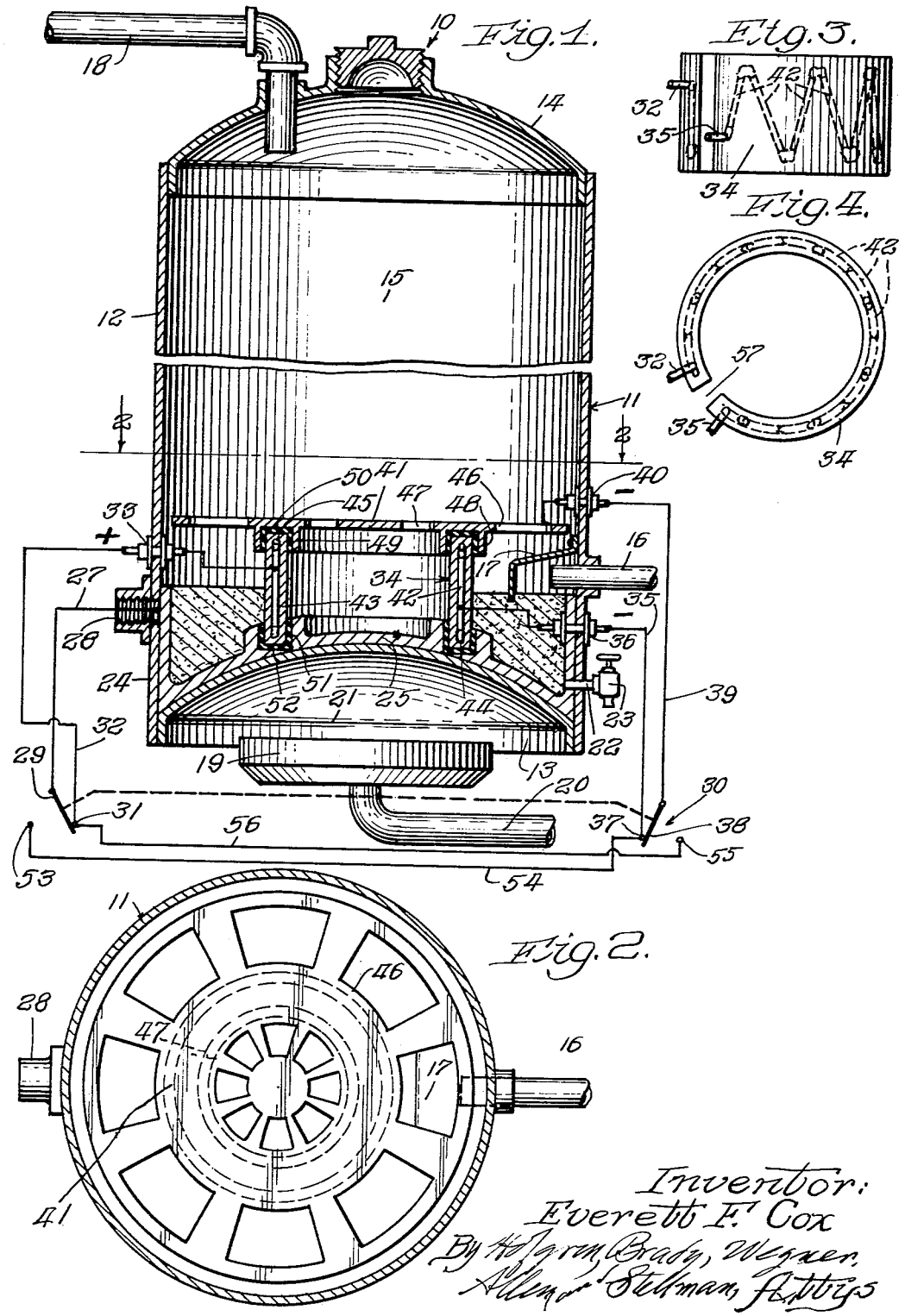

3,135,678
WATER HEATER PROTECTED WITH THERMO-
ELECTRICALLY SUPPLIED ENERGY
Everett F. Cox, Benton Harbor, Mich., assignor to
Whirlpool Corporation, a corporation of Delaware
Filed July 24, 1961, Ser. No. 126,094
11 Claims. (Cl. 204—196)

This invention relates to water heaters and in particular to preventing undesirable scale formation in water heaters.

A serious problem encountered in the operation of water heaters, such as conventional home hot water heaters, is the formation of scale on the inner surfaces of the tank. Such scale, comprising a precipitate of calcium carbonate, calcium sulfate, etc. tends to form on the hottest portion of the tank where heat is applied by the associated heat supply means, conventionally the bottom of the tank. The layer of scale which builds up such as on the bottom of the tank substantially reduces the efficiency of heat transfer therethrough, thereby causing the temperature of the tank metal to rise to a point where the metal is fatigued and caused to rupture.

Waters found in different geographical locations may vary widely in different characteristics such as the pH, quantity of solids dissolved therein, and the nature of the dissolved solids. However, the principal dissolved solid in substantially all such natural waters is calcium carbonate. It has long been erroneously considered that calcium carbonate particulates carry a negative electrical charge, and no satisfactory method of precluding scaling by such calcium carbonate particulates has heretofore been developed, principally because of the failures of the art in the past to fully understand the true nature of the problem. It has now been determined that such calcium carbonate particulates exhibit a positive zeta potential in such waters. The present invention is concerned with a water heater in which this electro-positive characteristic of the calcium carbonate particulates is utilized to eliminate undesirable scale formation on the inner tank surfaces by repelling such positively charged calcium carbonate particulates from a positively charged inert liner covering the heated surface.

One of the features of this invention therefore is to provide a new and improved water heater having means associated therewith for the control prevention and removal of scale deposition.

Other features and advantages of the invention will be apparent from the following description taken in conjunction with the accompanying drawings. Of the drawings:

FIGURE 1 is a schematic diametric section of a water heater embodying the invention.

FIGURE 2 is a horizontal sectional view taken substantially along the line 2—2 of FIGURE 1.

FIGURE 3 is a schematic elevation of a thermopile forming a part of the structure of FIGURE 1.

FIGURE 4 is a plan view of the thermopile of FIGURE 3.

In the exemplary embodiment of the invention, as disclosed in the drawing, a hot water heater generally designated 10 is shown to comprise a water tank generally designated 11 including a tubular portion 12 closed at its lower end by a bottom wall 13 and at its upper end by a cover 14. Cold water is delivered to the space 15 within the tank 11 through an inlet 16 adjacent the lower end of the tank and provided with a suitable baffle 17, the hot water (not shown) being delivered from the tank through an outlet 18 in the cover 14. A burner 19 of suitable construction, fed with suitable fuel through a delivery conduit 20, is disposed below the bottom wall 13 for delivering heat energy through the bottom wall to the water in tank space 15. Bottom wall 13 is preferably domed, providing a heating space 21 above the heater 19. Extending through tubular wall 12 adjacent bottom wall 13 is a flushing outlet 22 controlled by a suitable valve 23, permitting the tank 11 to be flushed by the operator as desired.

An inert, electrically and thermally conductive liner 25 is provided on the inner surfaces of the bottom wall 13 and tubular wall end portion 24. Herein, the liner is formed of graphite and is cemented to the inner surfaces of the bottom wall 13 and tubular wall end portion 24 preferably by a thermally conductive, dielectric cement such as the beryllium oxide resin composition disclosed in copending Faneuf application Serial No. 35,044, assigned to the assignee hereof. However, an inert metal such as platinum, duriron and titanium may be electro-plated to the inner surfaces of the bottom wall 13 and the tubular wall end portion 24 to obtain the same protective results as by using the cemented liner 25. While the protective liner 25 or the protective electroplated inert metal coating may be arranged so as to cover substantially the entire inner surface of the tank, or the tank may be fabricated entirely from inert metal, substantially scale-free operation of the tank may be effected with the liner or coating extending over only the lower surface areas as shown, because the scale-forming catalytic reactions produced by the concentrated heat source during the heating process occur primarily at the lower surface areas.

Liner 25 is connected by a wire 27 extending outwardly through tank wall 12 through a suitable insulating bushing 28 to one movable contact 29 of a double pole-double throw switch 30, the associated fixed contact 31 of switch 30 being connected by a suitable wire 32 and bushing 33 to the positive side of an electrical power source which is a direct current generating thermoelectric device 34. In the case of the electro-plated coating, wire 27 may be connected directly to the tank adjacent bushing 28. The negative side of the power source 34 is connected by a wire 35 and bushing 36 to a first fixed contact 37 associated with a second movable contact 38 of switch 30 while movable contact 38 is connected by a wire 39 which extends through a suitable bushing 40 in the tank portion 12 to an electrode 41.

The thermoelectric direct current generating device 34 is located in the bottom of the tank 11 and comprises a thermopile of generally cylindrical shape. The thermopile includes a casing 43 made from dielectric, poor thermal conductive ceramic material such as mullite having a general formula as follows: $3Al_2O_3 \cdot 2SiO_2$ (aluminum silicate) and a plurality of p-type and n-type conductors 42, such as iron and constantan, arranged in the customary series manner to give added potential differences so that the current density between electrodes 25 and 41 will be at least approximately 0.8 milliampere per square inch.

The thermopile has a relatively hot side 44 formed of the hot junctions of the conductors 42 and a relatively cold side 45 formed of the cold junctions. The thermopile is mounted within the space 15 so as to be immersed in the water in the tank and the hot side is held by the liner 25 and is attached thereto so as to receive heat from the burner 19. The cold side 45 is spaced from the liner 25 and is cooled by water at the bottom of the space 15. In an actual embodiment of the invention it was found that under these conditions the hot side was subject to a temperature of about 530° F. while the cold side was cooled by the water to a temperature of about 170° F. With about 200 iron-constantan thermocouples in the thermopile this temperature difference was ample to generate the required voltage.

The electrode 41 is in the form of a flat circular plate in the illustrated embodiment, supported substantially horizontally across the interior of the space 15 by the thermopile 43. With this arrangement the electrode 41 is adjacent the liner 25 so as to reduce the amount of voltage required to cause current flow therebetween and so that a relatively small number of thermocouples 42 will be required in the thermopile 43. The electrode 41 is provided with a plurality of openings 46 adjacent its outer edge and a plurality of openings 47 adjacent its center. As can be seen in FIGURE 1 the electrode 41 is provided with downwardly extending and concentric circular flanges 48 and 49 to form a groove receiving the upper edge of the thermopile 34. This provides a strong and rigid structure when the upper edge of the thermopile and the electrode are mounted together as by the cement 50. There is a similar upwardly extending groove 51 in the liner 25 in which the bottom edge of the thermopile 43 is attached as by means of cement 52. This arrangement provides a strong and rigid structure in the bottom of the tank 11.

By making the graphite liner 25 a positively charged anode and the electrode 41 a negatively charged cathode, the particulate calcium carbonate in the water will tend to migrate to the electrode 41 to be deposited thereon but will be repelled away from liner anode 25. The graphite liner 25 on the bottom wall 13 of the tank has high thermal conductivity and, as scale is prevented from being formed thereon, high efficiency of heat transfer from the burner 19 to water in tank space 15 is maintained.

More specifically, it has been found that effective prevention of scale formation on tank walls requires a current density of at least approximately 0.8 and preferably at least 1.5 milliamperes per square inch. A direct current of approximately 1.5 milliamperes per square inch has been found to be highly effective for descaling the graphite liner 25 where it has become scaled as by operation of the hot water heater without employing the scale preventing means discussed above.

To remove the calcium carbonate material from the electrode 41 when desired, the switch 30 may be manipulated to connect movable contact 29 with a fixed contact 53 connected by a wire 54 to wire 35, and connect movable contact 38 to a fixed contact 55 connected by a wire 56 to wire 32. Thus, the graphite liner 25 is connected to the negative side of the thermopile 43 making the graphite liner the cathode, and the electrode 41 is connected to the positive side of the thermopile 34 making the electrode the anode of the electrical system. The current flowing through the water in space 15 now causes the calcium carbonate previously deposited on the electrode 41 to flake off and settle on the liner 25. However, the flaked scale particles do not adhere to the liner and may be readily removed from the tank by flushing the tank through suitable operation of valve 23 controlling the flushing outlet 22. The openings 46 and 47 in the electrode 41 and the opening 57 in the thermopile 34 are passages for wtaer and scale therethrough both during the descaling and particularly when the tank is being flushed. Openings 46 and 47 also allow circulation of water during the heating process.

It has further been found that during the normal operation of the hot water heater 10, wherein switch 30 is arranged to make liner 25 the positively charged anode and the electrode 41 the negatively charged cathode, the scale on the electrode 41 tends to build up only to a preselected point and then further particulates migrating to the electrode 41 tend to rest loosely thereon or fall therefrom. The loose scale may be removed periodically from the hot water heater by suitable flushing the tank through outlet 22 at intervals determined by the rapidity with which the scale is formed.

In addition to providing an effective electrically conductive anode, the graphite liner by virtue of its inert characteristics provides an improved corrosion resistance at the tank surface most susceptible to corrosion, namely the surfaces adjacent the burner 19. Thus, even without providing the desirable electrical current through the tank by means of the anode liner 25, an improved operation of the hot water heater results from the use of the graphite liner.

Having described our invention as related to the embodiment shown in the accompanying drawings, it is our intention that the invention be not limited by any of the details of description, unless otherwise specified, but rather be construed broadly within its spirit and scope as set out in the accompanying claims.

I claim:
1. A water heating vessel comprising: a tank for holding water to be heated; means for delivering heat energy through one portion of the tank for heating the water, said means including a heat source; an inert, electrically conductive anode member at the inner surface of said one tank portion; an electrode spaced from said member to have contact with water in the tank; a direct current generating thermoelectric device having a relatively hot side heated by said heat source and a relatively cooler side subjected to water in said tank spaced from said one tank portion to be cooled by said water and thereby provide a temperature differential across said thermoelectric device generating a direct current voltage thereacross; and means causing direct current generated by said device to flow through the water in the tank from said anode member to said electrode.

2. The heater of claim 1 wherein said conductive anode member includes an electrical and thermal conductive liner attached to said inner surface.

3. A water heating vessel, comprising: a tank for holding water to be heated; means for delivering heat energy through one portion of the tank for heating the water, said means including a heat source; an inert, electrical and thermal conductive anode liner attached to the inner surface of said one tank portion; an electrode spaced from said liner to have contact with water in the tank; a direct current generating thermoelectric device within said tank having a relatively hot side in heat receiving relationship with said one tank portion and a relatively cooler side spaced from said one tank portion in heat delivering relationship with the water in the tank thereby to provide a temperature differential across said thermoelectric device generating a direct current voltage thereacross; and means causing direct current generated by said device to flow through the water in the tank from said anode liner to said electrode.

4. A water heating vessel, comprising: a tank for holding water to be heated; means for delivering heat energy through one portion of the tank for heating the water, said means including a heat source; an inert electrically conductive anode member at the inner surface of said one tank portion; an electrode positioned in said tank in spaced but adjacent relationship with said member for contact with water stored in said tank; a direct current generating thermoelectric device having a hot side in heat receiving relationship with said heat source and a relatively cooler side in heat delivering relationship with the water in said tank spaced from said one tank portion; and means causing direct current generated by said device to flow through the water in the tank from said anode member to said electrode.

5. A water heating vessel, comprising: tank for holding water to be heated; means for delivering heat energy through one portion of the tank for heating the water, said means including a heat source; an inert, electrically conductive anode member at the inner surface of said one tank portion; an electrode positioned in said tank for complete submersion in water stored in said tank; a direct current generating thermoelectric device having a relatively hot side heated by said heat source and a relatively cooler side in heat delivering relationship with the water in said tank spaced from said one tank portion thereby to provide a temperature differential across said thermoelectric device generating a direct current voltage thereacross; and means causing direct current generated by said device to flow through the water in the tank from said anode member to said electrode.

6. A water heating vessel comprising a tank for holding water to be heated; means for delivering heat energy through one portion of the tank for heating the water, said means including a heat source; an inert electrically conductive anode member at the inner surface of said one tank portion; an electrode positioned in said tank for complete submersion in water stored in said tank, said electrode being spaced from but adjacent said member; a direct current generating thermoelectric device having a relative hot side heated by said heat source and a relative cooler side in heat delivering relationship with the water in said tank spaced from said one tank portion thereby to provide a temperature differential across said thermoelectric device generating a direct current voltage thereacross; and means causing direct current generated by said device to flow through the water in the tank from said anode member to said electrode.

7. A water heating vessel, comprising: a tank for holding water to be heated; means for delivering heat energy through one portion of the tank for heating the water, said means including a heat source; an inert, electrically and thermally conductive anode liner attached to the inner surface of said one tank portion; an electrode positioned in said tank in spaced but adjacent relationship with said anode liner for contact with water stored in said tank; a direct current generating thermoelectric device within said tank having a relatively hot side in heat receiving relationship with said one tank portion and a relatively cooler side spaced from said one tank portion in heat delivering relationship with the water in the tank thereby to provide a temperature differential across said thermoelectric device generating a direct current voltage thereacross, said device being in thermal transfer contact with said anode liner and spaced from said electrode; and means causing direct current generated by said device to flow through the water in the tank from said anode liner to said electrode.

8. A water heating vessel, comprising: a tank for holding water to be heated; means for delivering heat energy through one portion of the tank for heating the water, said means including a heat source; an inert, electrical and thermal conductive anode liner attached to the inner surface of said one tank portion; an electrode positioned in said tank in spaced but adjacent relationship with said anode liner for contact with water stored in said tank; a direct current generating thermoelectric device within said tank having a relatively hot side in heat receiving relationship with said one tank portion and a relatively cooler side spaced from said one tank portion in heat delivering relationship with the water in the tank thereby to provide a temperature differential across said thermoelectric device generating a direct current voltage thereacross, said device being located between said anode liner and said electrode and serving as a support for said electrode to which the electrode is dielectrically attached; and means causing direct current generated by said device to flow through the water in the tank from said anode liner to said electrode.

9. The heater of claim 8 wherein said electrode has a substantial surface area transversely of said tank and is provided with a plurality of openings therethrough.

10. A water heating vessel, comprising: a tank for holding water to be heated; means for delivering heat energy through one portion of the tank for heating the water, said means including a heat source; an inert, conductive anode member at the inner surface of said one tank portion; an electrode positioned in said tank in spaced but adjacent relationship with said anode member for contact with water stored in said tank; a dielectric poorly thermally conductive casing, said casing being in contact with said anode member at one end and with said electrode at the other end; thermoelectric elements embedded in said casing to be heated by said heat source and cooled by water in said tank thereby to provide a temperature differential across said thermoelectric elements generating a direct current voltage thereacross; and means causing direct current generated by said elements to flow through the water in the tank from said anode member to said electrode.

11. The heater of claim 10 wherein said elements are subjected to a relatively high temperature caused by said heat source at their one ends and relatively cooler temperature at their other ends.

References Cited in the file of this patent

UNITED STATES PATENTS

| | | |
|---|---|---|
| 1,576,581 | Elmore et al. | Mar. 16, 1926 |
| 1,825,477 | Reichart | Sept. 29, 1931 |
| 2,748,250 | Andrus | May 29, 1956 |
| 2,808,373 | Andrus | Oct. 1, 1957 |
| 2,864,750 | Hughes et al. | Dec. 16, 1958 |

FOREIGN PATENTS

| | | |
|---|---|---|
| 232,216 | Australia | Jan. 18, 1961 |